(12) United States Patent
Ma et al.

(10) Patent No.: US 10,776,603 B2
(45) Date of Patent: Sep. 15, 2020

(54) DISPLAY PANEL AND DISPLAY DEVICE

(71) Applicant: WUHAN TIANMA MICRO-ELECTRONICS CO., LTD., Wuhan (CN)

(72) Inventors: Yangzhao Ma, Wuhan (CN); Tao Peng, Wuhan (CN); Yongzhi Wang, Wuhan (CN)

(73) Assignee: Wuhan Taianma Micro-Electronics Co., Ltd., Wuhan (CN)

( * ) Notice: Subject to any disclaimer, the term of this patent is extended or adjusted under 35 U.S.C. 154(b) by 50 days.

(21) Appl. No.: 16/218,497

(22) Filed: Dec. 13, 2018

(65) Prior Publication Data
US 2019/0114459 A1   Apr. 18, 2019

(30) Foreign Application Priority Data
Jun. 29, 2018  (CN) .......................... 2018 1 0695732

(51) Int. Cl.
*G06K 9/00* (2006.01)
*G09G 3/32* (2016.01)

(52) U.S. Cl.
CPC .......... *G06K 9/0004* (2013.01); *G06K 9/001* (2013.01); *G09G 3/32* (2013.01); *G09G 2300/0426* (2013.01); *G09G 2300/0452* (2013.01)

(58) Field of Classification Search
None
See application file for complete search history.

(56) References Cited

U.S. PATENT DOCUMENTS

| 2018/0089491 | A1* | 3/2018 | Kim | G06F 3/0412 |
| 2018/0277065 | A1* | 9/2018 | Zuo | G09G 5/363 |
| 2019/0057239 | A1* | 2/2019 | Hou | G06K 9/0004 |
| 2019/0332841 | A1* | 10/2019 | Zhou | G09G 3/3233 |
| 2019/0347987 | A1* | 11/2019 | Zhao | G09G 3/3225 |
| 2019/0362667 | A1* | 11/2019 | Ma | G06K 9/0004 |

* cited by examiner

*Primary Examiner* — Nicholas J Lee
(74) *Attorney, Agent, or Firm* — Kilpatrick Townsend & Stockton, LLP

(57) ABSTRACT

The present disclosure provides a display panel and a display device. The display panel includes: gate lines and data lines defining sub-pixel regions, each of which includes a pixel circuit and a light emitting element having an anode; and light-emission control signal lines and power signal lines dividing each sub-pixel region into a primary non-opaque region and a non-primary non-opaque region, the pixel circuit being located within the non-primary non-opaque region. The display area includes a fingerprint recognition region, and each anode within the fingerprint recognition region has an approximately quadrangular shape having parallel opposite edges. At least one pair of opposite edges of the anode forms an angle α with respect to a row direction, where 0°<α<90°.

20 Claims, 13 Drawing Sheets

DISPLAY PANEL AND DISPLAY DEVICE

CROSS-REFERENCE TO RELATED APPLICATIONS

The present disclosure claims priority to Chinese Patent Application No. 201810695732.5, filed on Jun. 29, 2018, the content of which is incorporated herein by reference in its entirety.

FIELD

The present disclosure relates to the field of display technologies, and in particular, to a display panel and a display device.

BACKGROUND

For a display panel having fingerprint recognition function, in order to better achieve full-screen design and prevent a fingerprint recognition region from occupying space of a non-display area, a display area can be reused as the fingerprint recognition region by adopting an under-screen fingerprint technology.

However, based on the existing arrangement of the metal layer within the display area, a non-opaque region within the fingerprint recognition region has a small area, so that only a small amount of light is reflected into the fingerprint recognition region by the touch body during the fingerprint recognition process, resulting in low detection accuracy of fingerprint recognition.

SUMMARY

In view of this, an embodiment of the present disclosure provides a display panel and a display device, which can increase the area of the non-opaque region within the fingerprint recognition region and thus improve the accuracy of fingerprint recognition.

In one embodiment, the present disclosure provides a display panel, having a display region and a non-display region surrounding the display region. The display panel includes: a base substrate; a plurality of gate lines provided on base substrate and extending in a row direction and a plurality of data lines provided on base substrate and extending in a column direction, and the plurality of gate lines intersects with the plurality of data lines to define a plurality of sub-pixel regions; a plurality of pixel circuits arranged in a matrix on the base substrate and a plurality of light-emitting elements, and one of the plurality of pixel circuits and one of the plurality of light-emitting elements are provided in each of the plurality of sub-pixel regions, and each of the plurality of light-emitting elements includes an anode, a light-emitting layer and a cathode that are sequentially stacked on a side of the plurality of pixel circuits facing away from the base substrate; and a plurality of light-emission control signal lines provided on the base substrate and extending in the row direction and a plurality of power signal lines provided on the base substrate and extending in the column direction, and the plurality of light-emission control signal lines intersects with the plurality of data lines in an insulation manner, and the plurality of power signal lines intersects with the plurality of gate lines in an insulation manner; the plurality of light-emission control signal lines and the plurality of power signal lines divide each of the plurality of sub-pixel regions into a primary non-opaque region and a non-primary non-opaque region; and a corresponding one of the plurality of pixel circuits is located within the non-primary non-opaque region. The display area includes a fingerprint recognition region, and for each sub-pixel region of the plurality of sub-pixel regions within the fingerprint recognition region, the anode is in an approximately quadrangular shape having two pairs of parallel opposite edges, and at least one pair of the two pairs of opposite edges of the anode extends along an extension direction forming an angle α with respect to the row direction, where $0°<α<90°$.

In another embodiment, the present disclosure provides a display device including the above mentioned display panel.

BRIEF DESCRIPTION OF DRAWINGS

In order to more clearly illustrate embodiments of the present disclosure, the accompanying drawings used in the embodiments are briefly introduced as follows. It should be noted that the drawings described as follows are merely part of the embodiments of the present disclosure.

DESCRIPTION OF EMBODIMENTS

For better illustrating technical solutions of the present disclosure, embodiments of the present disclosure will be described in detail as follows with reference to the accompanying drawings.

It should be noted that the described embodiments are merely exemplary embodiments of the present disclosure, which shall not be interpreted as providing limitations to the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association relationship describing associated objects, indicating that there may be three relationships, for example, A and/or B may indicate that three cases, i.e., A existing individually, A and B existing simultaneously, B existing individually. In addition, the character "/" herein generally indicates that the related objects before and after the character form an "or" relationship.

It should be understood that although the edge may be described using the terms of "first", "second", "third", etc., in the embodiments of the present disclosure, the edge will not be limited to these terms. These terms are merely used to distinguish edges from one another. For example, without departing from the scope of the embodiments of the present disclosure, a first edge may also be referred to as a second edge, and similarly, a second edge may also be referred to as a first edge.

Figure 1:
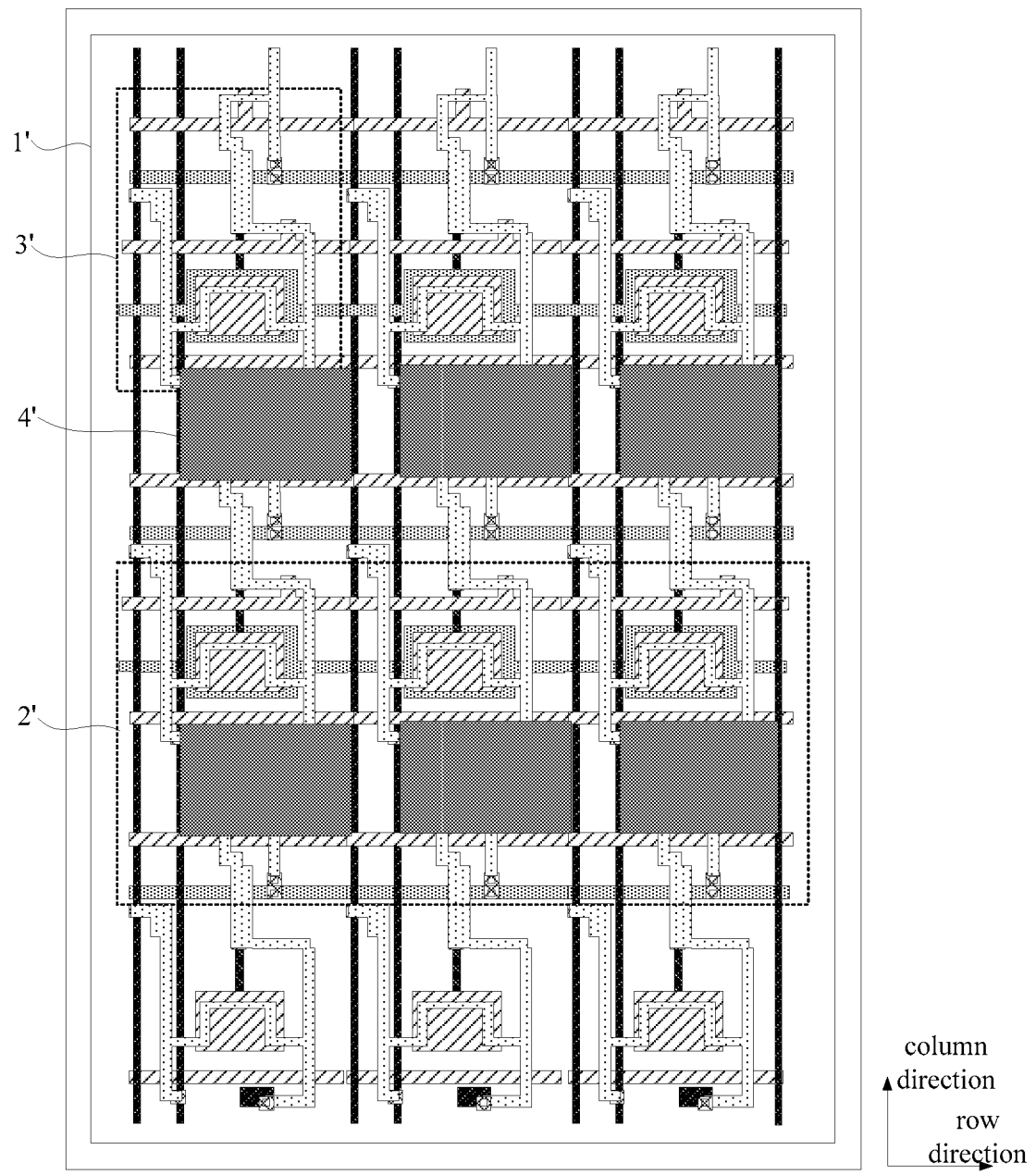
FIG. 1 is a schematic structural diagram of a display panel in the related art.

FIG. 1 is a schematic structural diagram of a display panel in the related art. As shown in FIG. 1, the display panel has a display area 1', and a part of the display area 1' is reused as a fingerprint recognition region 2'. A plurality of pixel circuits 3' arranged in a matrix is provided in the display area 1'. For each pixel circuit 3', a light-emitting element has an anode 4' that is arranged at a side of the pixel circuit 3' facing toward a light-exiting side. The anode 4' is in a rectangle shape. Extension directions of two pairs of opposite edges of the anode 4' are respectively parallel to a row direction and a column direction. However, with this arrangement of anodes 4', the anode 4' arranged within the fingerprint recognition region 2' may greatly block light reflected by the touch body, and then a small amount of light can reach the fingerprint recognition region during fingerprint recognition, resulting in poor accuracy of fingerprint recognition.

Figure 2:
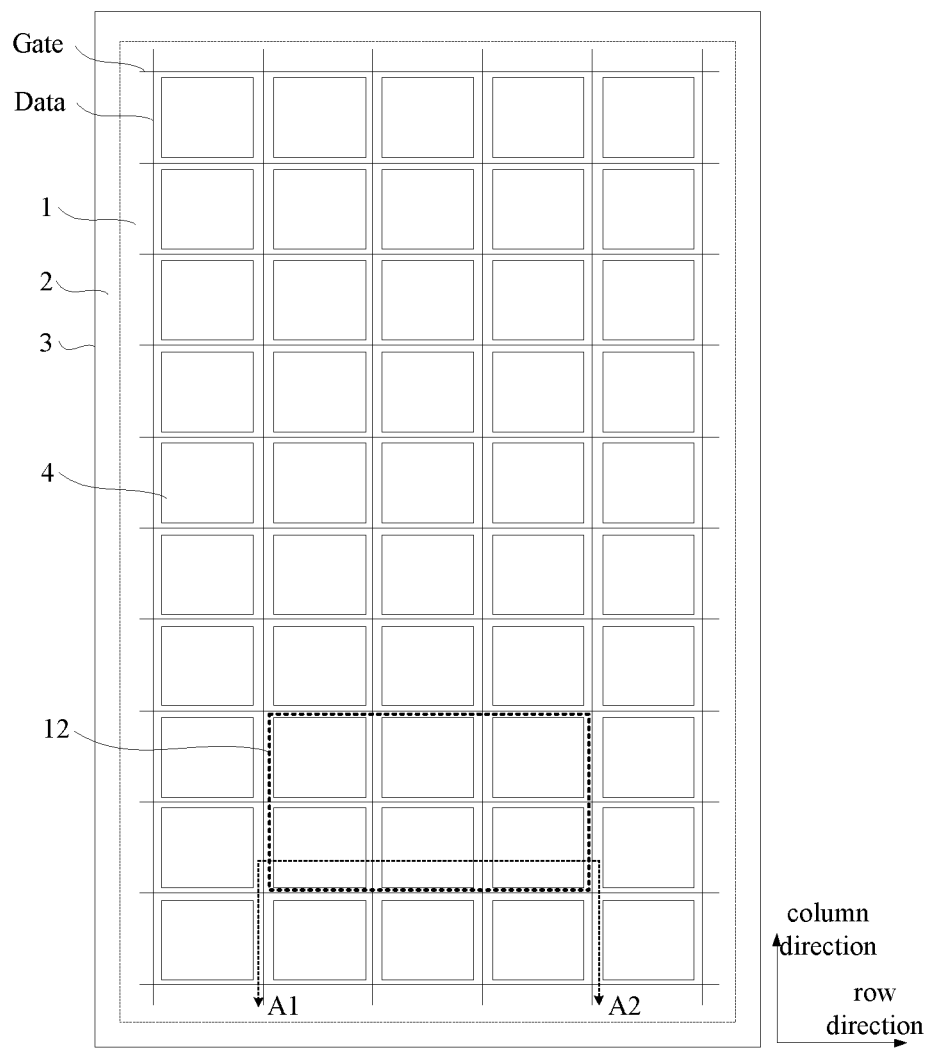
FIG. 2 is a schematic structural diagram of a display panel according to an embodiment of the present disclosure.
Figure 3:
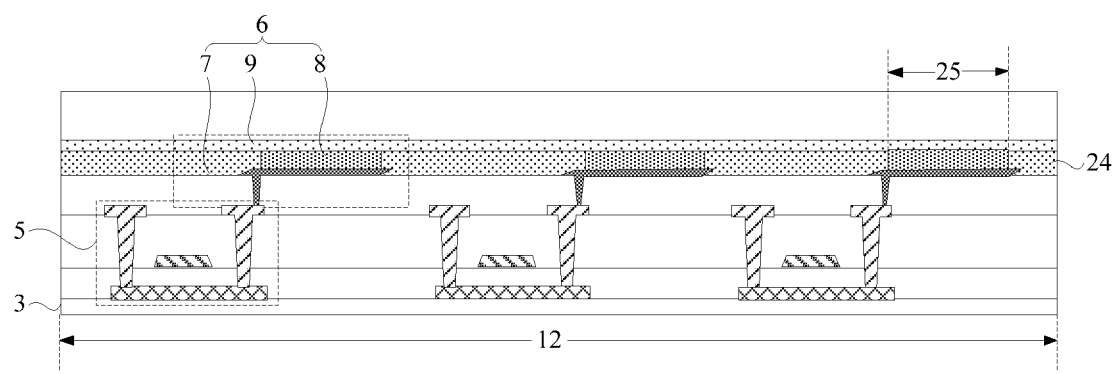
FIG. 3 is a cross-sectional view along line A1-A2 of FIG. 2.
Figure 4:
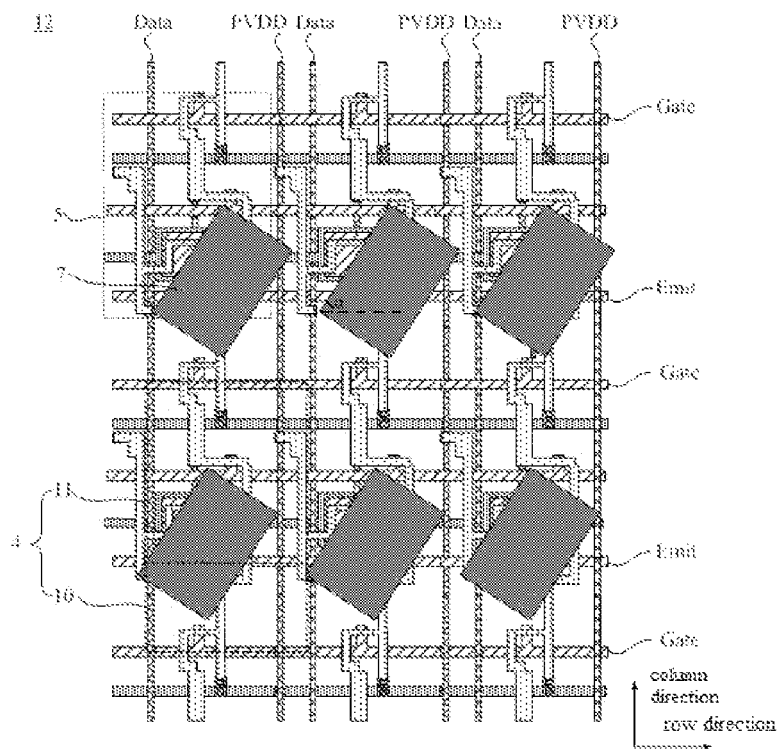
FIG. 4 is a schematic structural diagram of anodes within a fingerprint recognition region according to an embodiment of the present disclosure.

An embodiment of the present disclosure provides a display panel. FIG. 2 is a schematic structural diagram of a display panel according to an embodiment of the present disclosure, FIG. 3 is a cross-sectional view along line A1-A2 of FIG. 2, and FIG. 4 is a schematic structural diagram of anodes within a fingerprint recognition region according to an embodiment of the present disclosure. As shown in FIGS. 2-4, the display panel has a display area 1 and a non-display area 2 surrounding the display area 1. The display panel includes a base substrate 3. A plurality of gate lines Gate extending along the row direction and a plurality of data lines Data extending along the column direction are provided on the base substrate 3. The gate lines Gate intersect with the data lines Data to define a plurality of sub-pixel regions 4. A pixel circuit 5 and a light-emitting element 6 are provided in each sub-pixel region 4. The pixel circuits 5 are arranged in a matrix on the base substrate 3. The light-emitting element 6 includes an anode 7, a light-emitting layer 8 and a cathode 9 which are sequentially stacked on a side of the pixel circuit 5 facing away from the base substrate 3.

A plurality of light-emission control signal lines Emit and a plurality of power signal lines PVDD are further provided on base substrate 3. The plurality of light-emission control signal lines Emit extends along the row direction, and is insulated from and intersects with the data lines Data. The plurality of power signal lines PVDD extends along the column direction, and is insulated from and intersects with the gate lines. The light-emission control signal line Emit and the power signal line PVDD divide the sub-pixel region 4 into a primary non-opaque region 10 and a non-primary non-opaque region 11. The pixel circuit 5 is disposed within the non-primary non-opaque region 11.

The display area 1 further includes a fingerprint recognition region 12. For sub-pixel regions 4 within the fingerprint recognition region 12, the anode 7 is in an approximately quadrangular shape having two pairs of opposite edges. At least one pair of opposite edges of the anode 7 extends along an extension direction forming an angle α with respect to the row direction, where 0°<α<90°. An orthographic projection of at least part of the anode 7 on the base substrate 3 partially overlaps with an orthographic projection of the corresponding primary non-opaque region 10 on the base substrate 3.

It should be noted that, for one sub-pixel region 4, since the pixel circuit 5 includes a plurality of thin film transistors and storage capacitors, a large amount of metal film layers and metal traces are arranged within a region where the pixel circuit 5 is located. Due to the optical opacity of the metal structure, during the fingerprint recognition process, when light reflected by the touch body reaches the metal film layers and/or the metal traces, most of the reflected light may be blocked by the metal structure and cannot pass through it. Even if there are scattered parts in the region through which light can pass, such light may be ignored by the fingerprint recognition device, in other words, light in those parts of the region is invalid for fingerprint recognition. Therefore, such parts of the region correspond to the non-primary non-opaque region 11 of the sub-pixel region 4. For the primary non-opaque region 10 of the sub-pixel region 4, a small amount of metal film layers and metal traces are arranged within this region, resulting in a high light transmittance, and during the fingerprint recognition, most of the reflected light will reach the fingerprint recognition region 12 after passing through this region.

In an embodiment, an orthographic projection of at least part of the anode 7 on the base substrate 3 partially overlaps with an orthographic projection of the corresponding primary non-opaque region 10 on the base substrate 3. In this way, the position of the anode can meet the design requirement in such a manner that the position of the anode can be better matched with the thin film transistor correspondingly connected thereto and the anode can be prevented from overlapping with other conductive patterns such as traces within the non-primary non-opaque region, which would otherwise lead to crosstalk and affect the display.

In the related art, based on the shape and position of the anode, the entire anode would block a large part of the primary non-opaque region 10, resulting in that light may only pass through a small region within the fingerprint recognition region 12. For the display panel provided by this embodiment of the present disclosure, the arrangement of the anodes 7 within the fingerprint recognition region 12 is adjusted in such a manner that at least one pair of opposite edges of the anode 7 extends along an extension direction forming an angle with respect to the row direction, that is, the anode 7 is rotated by an angle with respect to the row direction, so that at least part of the anode can be misaligned with the primary non-opaque region, which can reduce the degree of the anode 7 blocking the primary non-opaque region 10. This can enlarge the region within the primary non-opaque region 10 which is not blocked by the anode 7. In this way, during the fingerprint recognition process, the probability of the reflected light reaching the fingerprint recognition region after passing through the primary non-opaque region 10 can be increased, thus the amount of the reflected light that reaches the fingerprint recognition region can be increased, and thereby the detection accuracy of fingerprint recognition can be improved.

Figure 5:
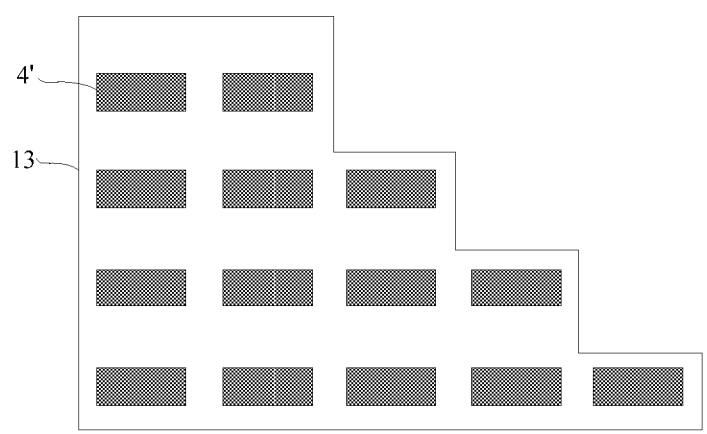
FIG. 5 is a schematic structural diagram of a step region corresponding to an arrangement of anodes in the related art.
Figure 6:
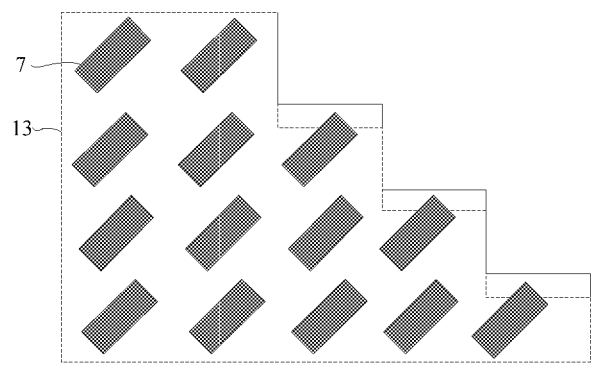
FIG. 6 is a schematic structural diagram of a step region corresponding to an arrangement of anodes according to an embodiment of the present disclosure.

Moreover, with the development of technologies, in order to meet individual needs of users, a display panel having a display area in an irregular shape, such as a non-rectangular shape, has gradually emerged. For an irregular-shaped display panel, the display area has an arcuate edge. For an irregular-shaped display panel having an arcuate edge, in order to achieve the design of the arcuate edge, it is necessary to arrange a different number of pixels in the row corresponding to each arcuate edge. By doing so, for the pixels located within this row corresponding to an arcuate edge, the positions of the pixels adjacent to the curved edge cannot be aligned, resulting in a step appearing at the edge region, which is referred to as a step region. FIG. 5 is a schematic structural diagram of a step region corresponding to an arrangement of anodes in the related art, and FIG. 6 is a schematic structural diagram of a step region corresponding to an arrangement of anodes according to an embodiment of the present disclosure. By comparing FIG. 5 and FIG. 6, it is seen from FIG. 6 that since the anode 7 in this embodiment of the present disclosure is rotated by an angle with respect to the row direction, the rotated anode 7 intersects with both the row direction and the column direction. That is, the rotated anode 7 has a component in the row direction and another component in the column direction, which is equivalent to reducing, both in the row direction and in the column direction, the misaligned distance between anodes located in two adjacent two rows. In other words, since the pixels are arranged in the row direction and in the column direction, and a jagged edge occurs because pixels located in two adjacent rows or columns cannot be aligned, the jagged edge is formed by line segments extending in the row direction and the column direction. With this embodiment, the rotated anode has components both in the row direction and in the column direction. Therefore, the arrangement of the anodes 7 can weaken the jagged feeling of the edge of the step region 13, such that the edge of the step region 13 can have a smoother contour and thus an edge of an image presented by the step region 13 can be smoother, thereby improving the display quality of the image.

Figure 7:
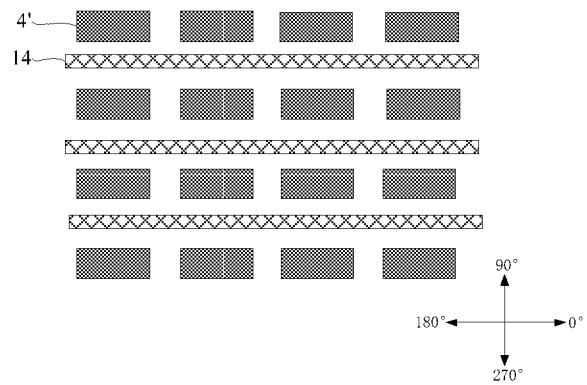
FIG. 7 is a schematic structural diagram of spacers corresponding to an arrangement of anodes in the related art.
Figure 8:
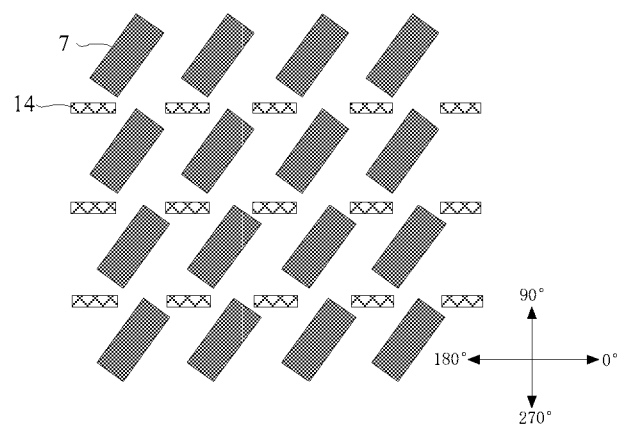
FIG. 8 is a schematic structural diagram of spacers corresponding to an arrangement of anodes according to an embodiment of the present disclosure.

Further, FIG. 7 is a schematic structural diagram of spacers corresponding to an arrangement of anodes in the related art, and FIG. 8 is a schematic structural diagram of spacers corresponding to an arrangement of anodes according to an embodiment of the present disclosure. As shown in FIG. 7 and FIG. 8, when anodes 4' are arranged in a manner in the related art, in order to prevent a spacer 14 from blocking the light-emitting region of the display panel, the spacer 14 is generally formed as a continuous configuration along the row direction. In this case, when viewing an image with a viewing angle range of 0° to 180°, the spacer 14 has a great refraction with respect to the light, and when viewing the image within a viewing angle range of 90° to 270°, the spacer 14 has a small refraction with respect to the light. This will result in a certain visual difference between the images viewed within the two viewing angle ranges. In an embodiment of the present disclosure, based on the arrangement of the rotated anodes 7, in order to prevent a spacer 14 from blocking the light-emitting region of the display panel, the spacer 14 is formed in a discontinuous configuration along the row direction. That is, the spacer 14 includes a plurality of spacer segments. With this configuration, the difference between refractions of the spacer 14 with respect to the light can be alleviated, and thus the difference between the image being viewed within different viewing angle ranges cane be alleviated.

Further, for the angle α, when the α is too great, the anode 7 occupies a large space in the column direction, and a small number of anodes 7 can be arranged along the column direction when the fingerprint recognition region 12 has a fixed length in the column direction. When α is too small, the rotation angle of the anode 7 with respect to the row direction is too small. As a result, the region within the primary non-opaque region which may be blocked by the anode 7 cannot be significantly reduced, and the transmittance of the reflected light cannot be significantly increased. For this reason, it is set that $30°≤α≤70°$. This can significantly reduce the region within the primary non-opaque region 10 which may be blocked by the anode 7 while allowing a sufficient number of anodes 7 to be arranged within the fingerprint recognition region 12.

Figure 9:
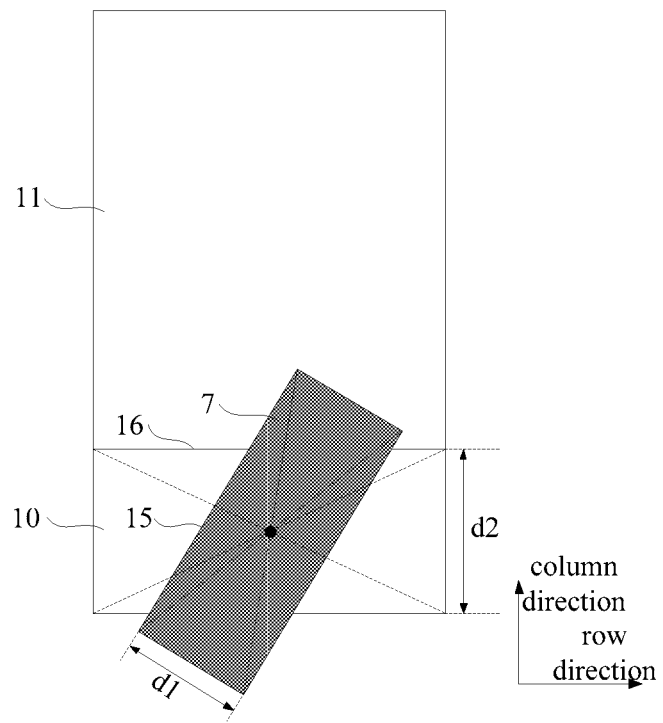
FIG. 9 is another schematic structural diagram of an anode within a fingerprint recognition region according to an embodiment of the present disclosure.

FIG. 9 is another schematic structural diagram of an anode within a fingerprint recognition region according to an embodiment of the present disclosure. In an embodiment, as shown in FIG. 9, a geometric center of the anode 7 substantially coincides with a geometric center of the primary non-opaque region 10. It should be noted that the geometric center of the anode 7 refers to an intersection point of diagonals of the anode 7, and the geometric center of the primary non-opaque region 10 refers to an intersection point of diagonals of the primary non-opaque region 10. It should be understood that the geometric centers here are merely for describing the structure of the anode 7, and that the display panel is not physically provided with diagonals or geometric centers for the anode 7 and the primary non-opaque region 10. Moreover, it should be noted that in manufacturing the anode 7, there is inevitably a misalignment, which causes the actual position of the anode 7 to deviate from its standard position. Therefore, the geometric center of the anode 7 substantially coinciding with the geometry center of the primary non-opaque region 10 means that the geometric center of the anode 7 coincides with the geometry of the primary non-opaque region 10 within an error-allowed range. By setting the geometric center of the anode 7 to substantially coincide with the geometry center of the primary non-opaque region 10, the region within the primary non-opaque region 10 which may be blocked by the anode 7 can be reduced, and the regularity of the arrangement of the anodes 7 can be improved, so that the positions of the anodes 7 can be in better correspondence with the corresponding primary non-opaque regions 10. In other words, even if the anode is misaligned with respect to the non-opaque region and the anode does not fit in the primary non-opaque region, the anode will not deviate from the primary non-opaque region, so that the primary non-opaque region exposed by the anode appears as two sub-regions that are symmetric about the center while the design requirements are satisfied.

In an embodiment, with further reference to FIG. 9, one pair of opposite edges of the anode 7 includes two oppositely disposed first edges 15, and the primary non-opaque region 10 includes two oppositely disposed second edges 16. The second edges 16 extend along the row direction. A perpendicular distance d1 between the two first edges 15 is smaller than a perpendicular distance d2 between the two second edges 16. An orthographic projection of one first edge 15 on the base substrate 3 overlaps with an orthographic projection of at least one second edge 16 on the base substrate 3. In this embodiment of the present disclosure, by setting the perpendicular distance d1 between the two first edges 15 to be smaller than the perpendicular distance d2 between the two second edges 16, when the anode 7 is rotated, the anode 7 which is completely located within the primary non-opaque region 10 in the related art is misaligned with respect to the primary non-opaque region 10, that is, a part of the anode 7 is moved from the primary non-opaque region 10 to the non-primary non-opaque region 11, so that the region within the primary non-opaque region 10 that may be blocked by the anode 7 can be reduced. Moreover, assuming that a distance between the other pair of opposite edges of the anode 7 has a fixed value, the smaller d1 is, the smaller an area of the region within the primary non-opaque region 10 blocked by the rotated anode 7 is, and the bigger the probability of light passing through the primary non-opaque region 10 is.

Figure 10:
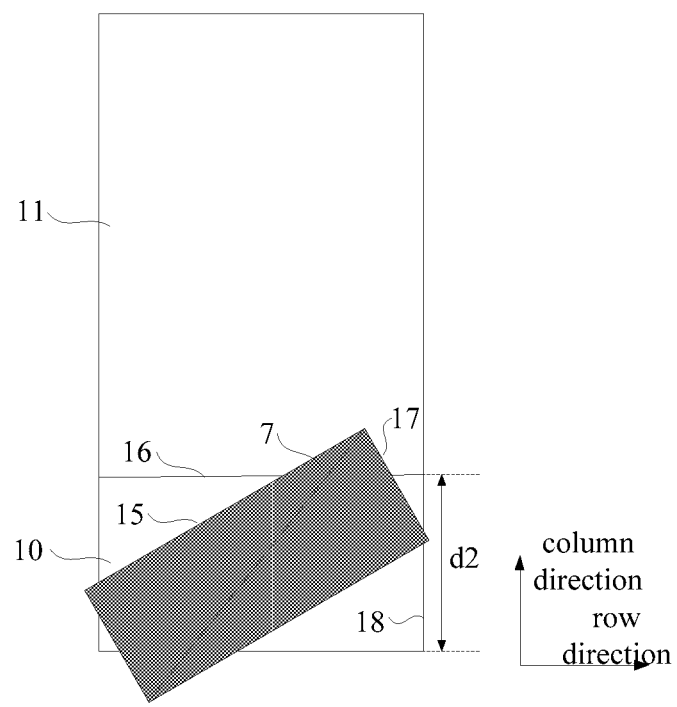
FIG. 10 is still another schematic structural diagram of an anode within a fingerprint recognition region according to an embodiment of the present disclosure.

FIG. 10 is still another schematic structural diagram of an anode within a fingerprint recognition region according to an embodiment of the present disclosure. As shown in FIG. 10, the other pair of opposite edges of the anode 7 includes two oppositely disposed third edges 17, and the primary non-opaque region 10 further includes two oppositely disposed fourth edges 18. In order to further achieve that only a part of the anode 7 blocks the primary non-opaque region 10, an orthographic projection of the third edge 17 on the base substrate 3 intersects with an orthographic projection of the second edge 16 on the base substrate and/or an orthographic projection of the fourth edge 18 on the base substrate 3.

With further reference to FIG. 10, the length of at least one diagonal of the anode 7 can be set to be larger than the perpendicular distance d2 between the two second edges 16. In a case where a length of a diagonal of the anode 7 being the maximum length of the anode 7 is too small, the degree of the anode 7 blocking the primary non-opaque region 10 may be still large even if the anode 7 is rotated. For example, if the length of the diagonal of the anode 7 is smaller than d2, even if the anode 7 is rotated, the anode 7 will completely fall into the range of the primary non-opaque region and thus the light transmittance cannot be increased. In a case where the anode 7 has a fixed area and the length of at least one diagonal of the anode 7 is set to be larger than the perpendicular distance d2 between the two second edges 16 of the primary non-opaque region, it can achieve that only a part of the anode 7 blocks the primary non-opaque region when the anode 7 is rotated, which can significantly reduce the area of the region within the primary non-opaque region 10 blocked by the anode 7. Thus, the longer diagonal for the anode 7 with a fixed area can achieve the better light transmittance after the anode 7 is rotated.

Figure 11:
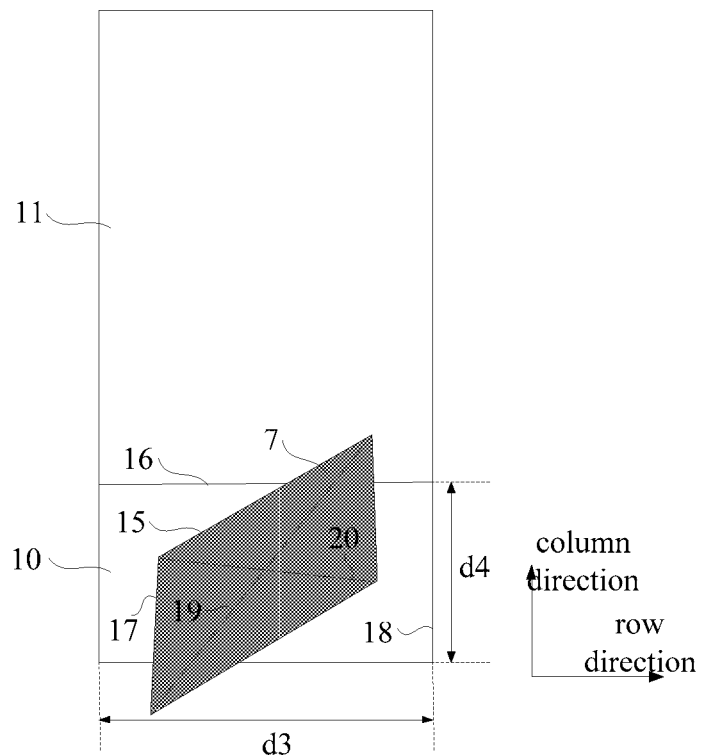
FIG. 11 is still yet another schematic structural diagram of an anode within a fingerprint recognition region according to an embodiment of the present disclosure.

In addition, in order to further achieve that only a part of the anode 7 blocks the primary non-opaque region, the longer diagonal of the anode 7 may intersect with the two second edges 16 of the primary non-opaque region 10. FIG. 11 is still yet another schematic structural diagram of an anode within a fingerprint recognition region according to an embodiment of the present disclosure. As shown in FIG. 11, a length d3 of the second edge 16 of the primary non-opaque region 10 is larger than a length d4 of the fourth edge 18. Further, the anode 7 includes a first diagonal 19 and a second diagonal 20, and the length of the first diagonal 19 is larger than the length of the second diagonal 20. An orthographic projection of the first diagonal 19 on the base substrate 3 overlaps with orthographic projections of the two second edges 16 on the base substrate 3.

Figure 12:
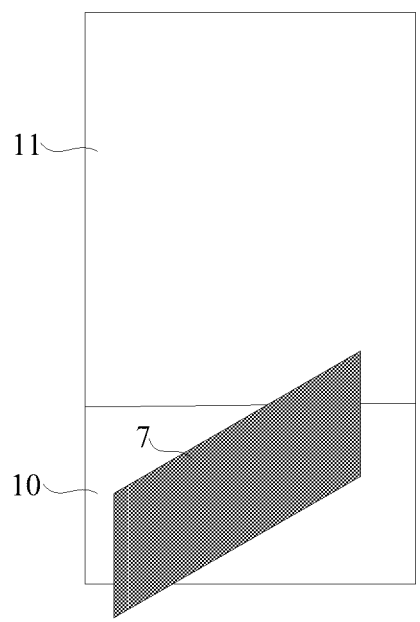
FIG. 12 is still yet another schematic structural diagram of an anode within a fingerprint recognition region according to an embodiment of the present disclosure.
Figure 13:
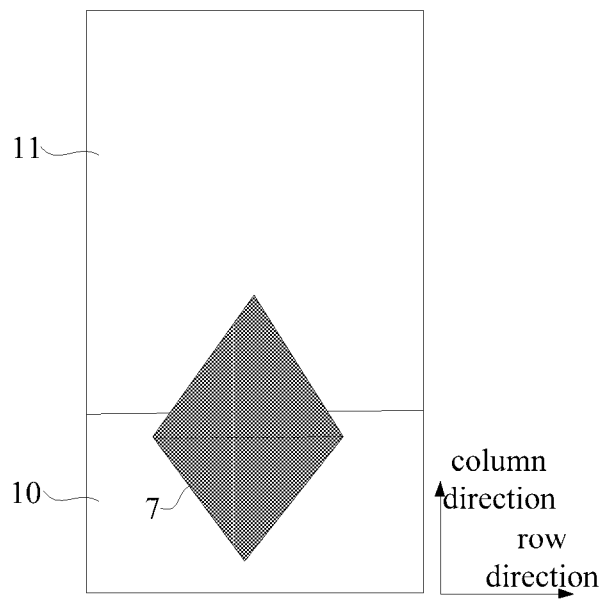
FIG. 13 is still yet another schematic structural diagram of an anode within a fingerprint recognition region according to an embodiment of the present disclosure.

In an embodiment, the shape of the anode 7 within the fingerprint recognition region 12 may be any one of a rectangular shape, a square shape, or a parallelogram shape. In an example, as shown in FIG. 12, which is still yet another schematic structural diagram of an anode within a fingerprint recognition region according to an embodiment of the present disclosure, when the shape of the anode 7 is a parallelogram shape, an extension direction of one pair of opposite edges of the anode 7 maybe be parallel to the row direction or column direction. In another example, as shown in FIG. 13, which is still yet another schematic structural diagram of an anode within a fingerprint recognition region according to an embodiment of the present disclosure, the shape of the anode 7 within the fingerprint recognition region 12 may be a rhombic shape or an approximately rhombic shape. When the shape of the anode 7 is a rhombic shape or an approximately rhombic shape, one diagonal of the anode 7 may be parallel to the row direction. In this embodiment of the present disclosure, the shape of the anode 7 is a square shape or a rhombic shape, and one diagonal of the anode 7 is parallel to the row direction. In this case, the shape of the anode 7 can be mismatched with the shape of the primary non-opaque region 10. Then, regardless of which pair of opposite edges of the anode 7 has an extension direction forming a large or small angle with respect to the row direction, that is, regardless of whether the anode 7 is rotated clockwise or counterclockwise, there would be a large region within the primary non-opaque region 10 that is not blocked by the anode 7. This can further improve the light transmittance. Moreover, compared with the case in which the shape of anode 7 is set to be a rectangular shape, since the anode 7 is in a rhombic shape or a square shape and one diagonal of the anode 7 is parallel to the row direction, the area of the anode 7 can be reduced and the size of the anode in the row direction can be reduced, so that the number of anodes arranged in one row can be increased. In addition, for an anode having a rhombic shape, since it has two diagonals having different lengths, an embodiment of the present disclosure sets the diagonal having a smaller length to be parallel to the row direction, so as to further increase the number of anodes that can be arranged in one row.

The length of the diagonal of an ordinary quadrangular anode is usually larger than lengths of its edges, and the diagonal of the anode tends to be parallel to the row direction after the anode is rotated. Therefore, for a quadrilateral whose diagonal has a much larger length than those of its edges, the original number of anodes cannot be accommodated in the row direction based on the original arrangement. In an embodiment provided by the present disclosure, the shape of the anode can be set to be a rhombic shape, at least one diagonal of the rhombic shape is smaller than the lengths of its edges, and the shorter diagonal of the rhombic anode is set to be parallel to or tend to be parallel to the row direction. In this way, there can be enough space for accommodating the anodes in the row direction without changing the area of the anode, and the transmittance of the display panel can be increased.

It can be understood that, in this embodiment, the primary non-opaque region is adjacent to the non-primary non-opaque region in the column direction, and there is substantially no non-primary non-opaque region between non-opaque regions of two adjacent pixels or a size of the non-primary non-opaque region is negligible relative to a pixel size. Therefore, the above embodiment mainly solves a problem of limited arrangement space in the row direction. In other embodiments of the present disclosure, the column direction may be analogous to the design of this embodiment.

Figure 14:
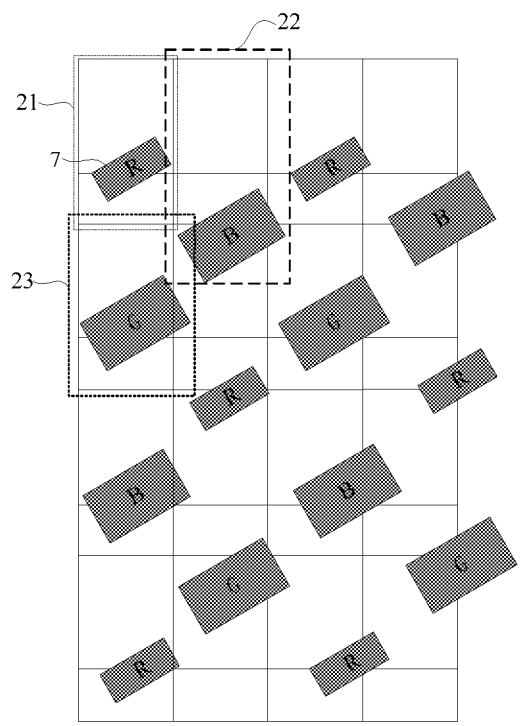
FIG. 14 is another schematic structural diagram of a display panel according to an embodiment of the present disclosure.

FIG. 14 is another schematic structural diagram of a display panel according to an embodiment of the present disclosure. As shown in FIG. 14, a plurality of sub-pixel regions 4 includes a first color sub-pixel region 21, a second color sub-pixel region 22, and a third color sub-pixel region 23. The anode 7 of the first color sub-pixel region 21, the anode 7 of the second color sub-pixel region 22, and the anode 7 of the third color sub-pixel region 23 are circularly arranged in the column direction. Adjacent anodes 7 in the row direction are not aligned. The anodes 7 of sub-pixel regions 4 having a same color are not adjacent to each other. That is, an anode 7 of a sub-pixel region 4 having a certain color is closest to anodes of sub-pixel regions 4 having different colors. Compared with the case in which the anodes 7 are aligned in the row direction, the spacing between adjacent anodes 7 in the row direction can be increased when adjacent anodes 7 misaligned in the row direction, thereby preventing mutual interference between signals of adjacent anodes 7.

With further reference to FIG. 14, in an embodiment, the first color sub-pixel region 21 is a red sub-pixel region, the second color sub-pixel region 22 is a blue sub-pixel region, and the third color sub-pixel region 23 is a green sub-pixel region. In the fingerprint recognition region 12, the anode 7 of each first color sub-pixel region 21 has an area of S1, the anode 7 of each second color sub-pixel region 22 has an area of S2, and the anode 7 of each third color sub-pixel region 23 has an area of S3, where S1<S2≤S3.

Figure 15:
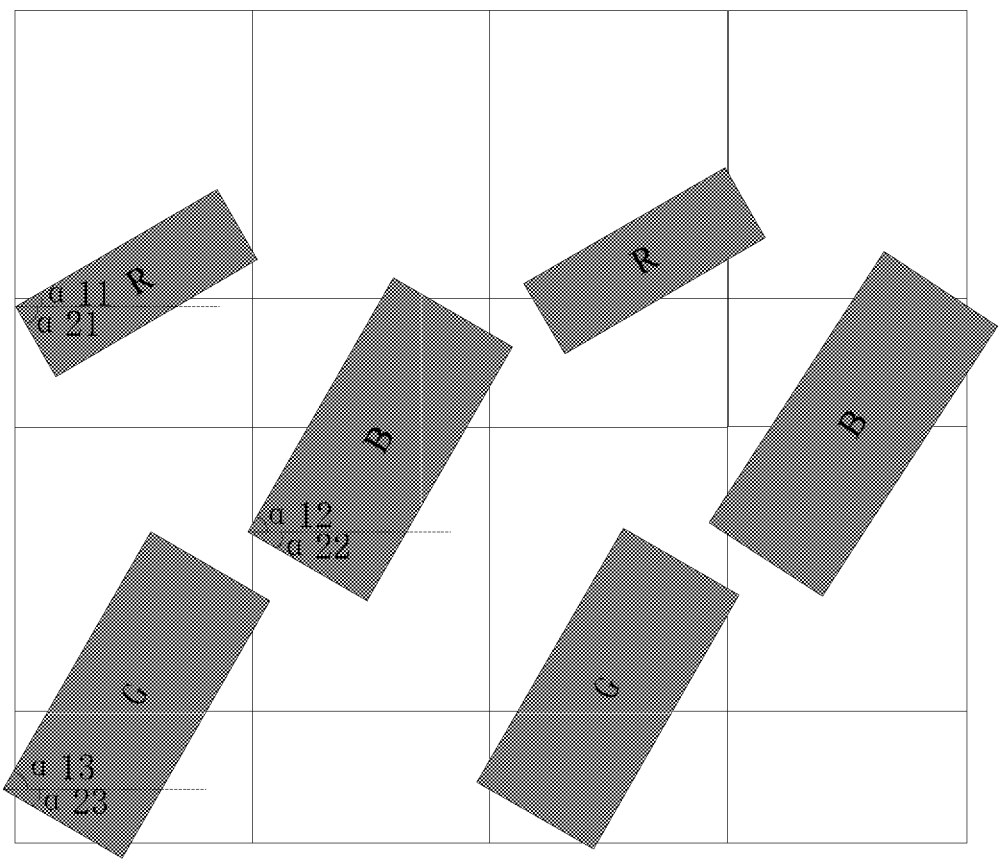
FIG. 15 is still yet another schematic structural diagram of anodes within a fingerprint recognition region according to an embodiment of the present disclosure.

It can be understood that, for a sub-pixel region 4, the region corresponding to the anode 7 is a light-exiting region, i.e., an aperture region, of the sub-pixel region 4. Since the blue sub-pixel region and the green sub-pixel region have a shorter lifetime than the red sub-pixel region, when setting the anodes 7 of the sub-pixel regions 4 having different colors, the areas of the anodes 7 of the blue sub-pixel region and the green sub-pixel region can be set to be larger, so that the current density of the blue sub-pixel region and the green sub-pixel region can be reduced and thus the lifetime of the blue sub-pixel region and the green sub-pixel region can decay more slowly, thereby resulting in similar lifetimes for the sub-pixel regions 4 having the three colors. Further, as shown in FIG. 15, which is still yet another schematic structural diagram of anodes within a fingerprint recognition region according to an embodiment of the present disclosure, for the sub-pixel region 4 of the fingerprint recognition region 12, one pair of opposite edges of the anode 7 has an extension direction forming a first angle with respect to the row direction, and the other pair of opposite edges of the anode 7 has an extension direction forming a second angle with respect to the row direction. The first angles corresponding to the first color sub-pixel region 21, the second color sub-pixel region 22 and the third color sub-pixel region 23 are respectively $\alpha 11$, $\alpha 12$, and $\alpha 13$, and the second angles corresponding to the first color sub-pixel region 21, the second color sub-pixel region 22 and the third color sub-pixel region 23 are respectively $\alpha 21$, $\alpha 22$, and $\alpha 23$, where $\alpha 11 < \alpha 12 \leq \alpha 13$, and $\alpha 21 > \alpha 22 \geq \alpha 23$.

Since S1<S2≤S3, the space in the fingerprint recognition region 12 occupied by the anode 7 within the second color sub-pixel region 22 and the space in the fingerprint recognition region 12 occupied by the anode 7 within the third color sub-pixel region 23 are respectively larger than the space in the fingerprint recognition region 12 occupied by the anode 7 within the first color sub-pixel region 21. In this case, when $\alpha 11 < \alpha 12 \leq \alpha 13$ and $\alpha 21 > \alpha 22 \geq \alpha 23$, it can be set that the anode 7 within the second color sub-pixel region 22 and the anode 7 within third color sub-pixel region 23 respectively have a smaller rotation angle with respect to the row direction than that of the anode 7 within the first color sub-pixel region 21 with respect to the row direction, thereby reducing the space in the row direction occupied by the anode 7 within the second color sub-pixel region 22 and the space in the row direction occupied by the anode 7 within the third color sub-pixel region 23. In this way, when the length of the fingerprint recognition region 12 in the row direction has a fixed value, more anodes 7 can be arranged.

In addition, with further reference to FIG. 3, a pixel definition layer 24 is further provided in the sub-pixel region 4 and arranged between the anode 7 and the cathode 9, and the pixel definition layer 24 is provided with apertures 25 one-to-one corresponding to the anodes 7 and exposing the anodes 7. The aperture 25 has a shape that is the same as the shape of the corresponding anode 7, and the extension directions of the two diagonals of the aperture 25 are the same as the extension directions of the two diagonals of the corresponding anode 7. An orthographic projection of an edge of one aperture 25 on the base substrate 3 is located within an orthographic projection of the corresponding anode 7 on the base substrate 3. With this arrangement, the shape of the aperture 25 can be better matched with the shape of the anode 7, so as to avoid that the sub-pixel region 4 cannot emit light normally due to mismatch of the shape of the aperture 25 with the shape of the anode 7.

Figure 16:
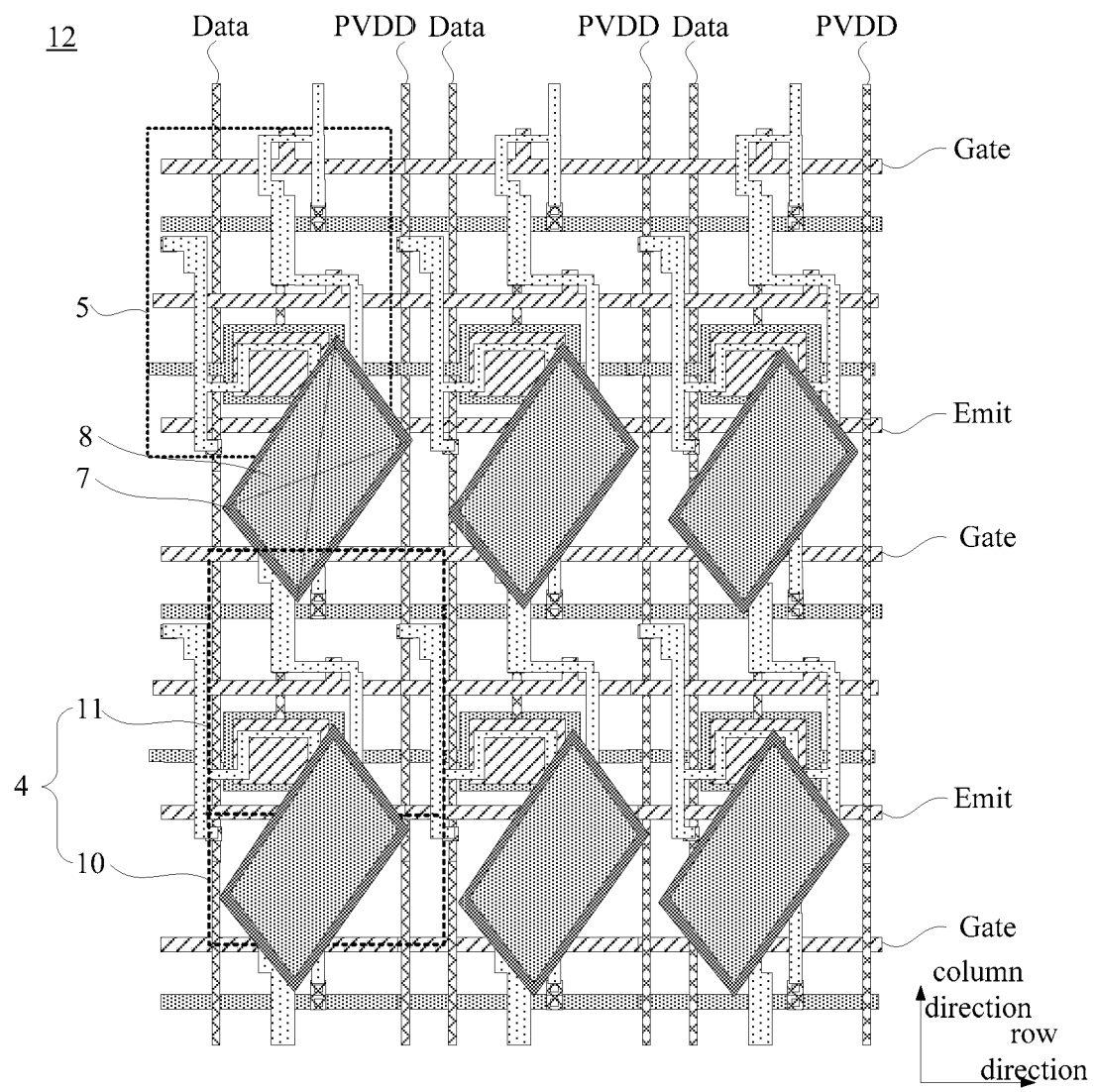
FIG. 16 is a schematic structural diagram of a light-emitting layer within a fingerprint recognition region according to an embodiment of the present disclosure.

For the light-emitting layer 8 located within the fingerprint recognition region 12, if the light-emitting layer 8 has a rectangular shape as in the related art, the shape of the light-emitting layer 8 cannot be better matched with the shape of the anode 7, which causes that the region in the primary non-opaque region 10 not blocked by the anode 7 will be blocked by the light-emitting layer 8. As a result, during fingerprint recognition, the light-emitting layer 8 may also block the reflected light to a certain extent, thereby reducing the light transmittance. Based on this, in order to avoid the influence of the light-emitting layer 8 on the reflected light, as shown in FIG. 16, which is a schematic structural diagram of a light-emitting layer within a fingerprint recognition region according to an embodiment of the present disclosure, the light-emitting layer 8 in the fingerprint recognition region 12 has a shape that is the same as the shape of the corresponding anode 7, and the extension directions of the two diagonals of light-emitting layer 8 are the same as the extension directions of the two diagonals of the corresponding anode 7.

Figure 17:
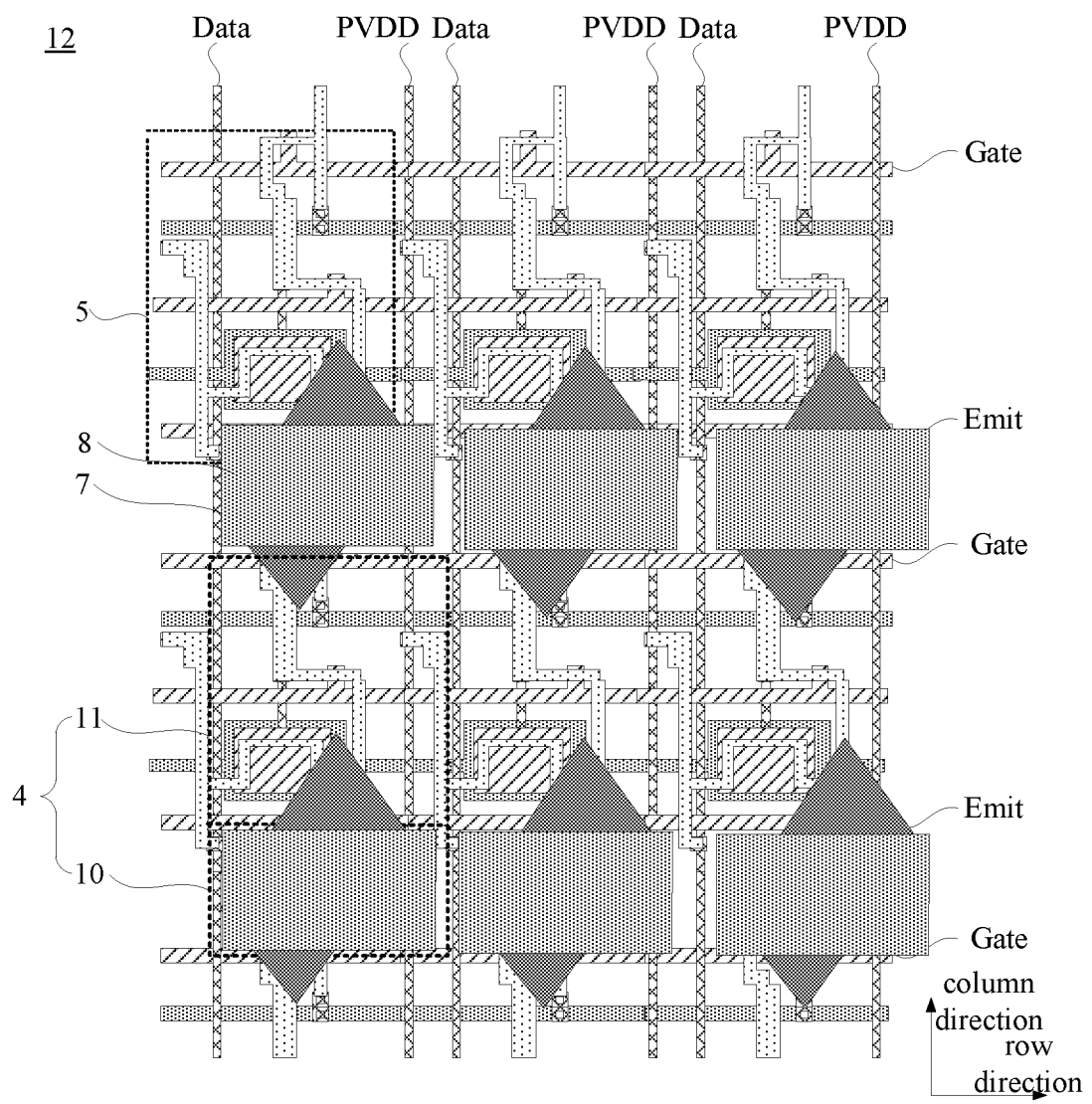
FIG. 17 is another schematic structural diagram of a light-emitting layer within a fingerprint recognition region according to an embodiment of the present disclosure.

As shown in FIG. 17, which is another schematic structural diagram of a light-emitting layer within a fingerprint recognition region according to an embodiment of the present disclosure, the shape of the light-emitting layer 8 in the fingerprint recognition region 12 can also be a rectangle shape or a rounded rectangle shape. In this case, the shape of the light-emitting layer 8 is the same as that of light-emitting layer 8 in the related art, and thus in manufacturing the light-emitting layer 8, an existing mask can be used to form the light-emitting layer 8 without replacing the mask, thereby reducing process costs.

Figure 18:
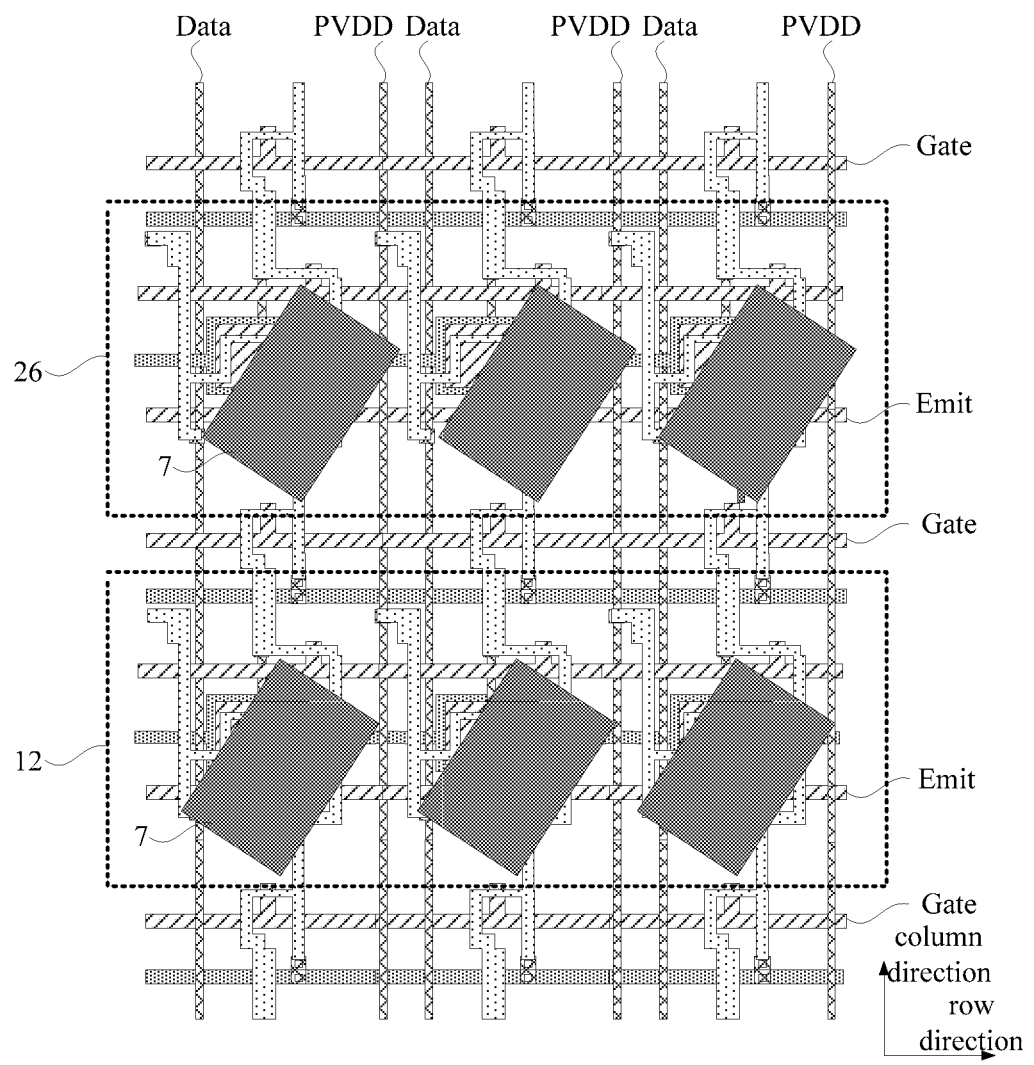
FIG. 18 is a schematic structural diagram of anodes within a non-fingerprint recognition region according to an embodiment of the present disclosure.

FIG. 18 is a schematic structural diagram of anodes within a non-fingerprint recognition region according to an embodiment of the present disclosure. As shown in FIG. 18, a part of the display area 1 is a non-fingerprint recognition region 26. In order to simplify the manufacturing process of the anodes 7 and improve the arrangement regularity of the anodes 7 within the display area 1, for sub-pixel regions 4 having a same color, the shape of the anode 7 located within the non-fingerprint recognition is the same as the shape of the anode 7 located within the fingerprint recognition region 12, and the pattern of the anode 7 located within the non-fingerprint recognition region 26 is the same as the pattern of the anode 7 located within the fingerprint recognition region 12 after the anode 7 being translated.

Figure 19:
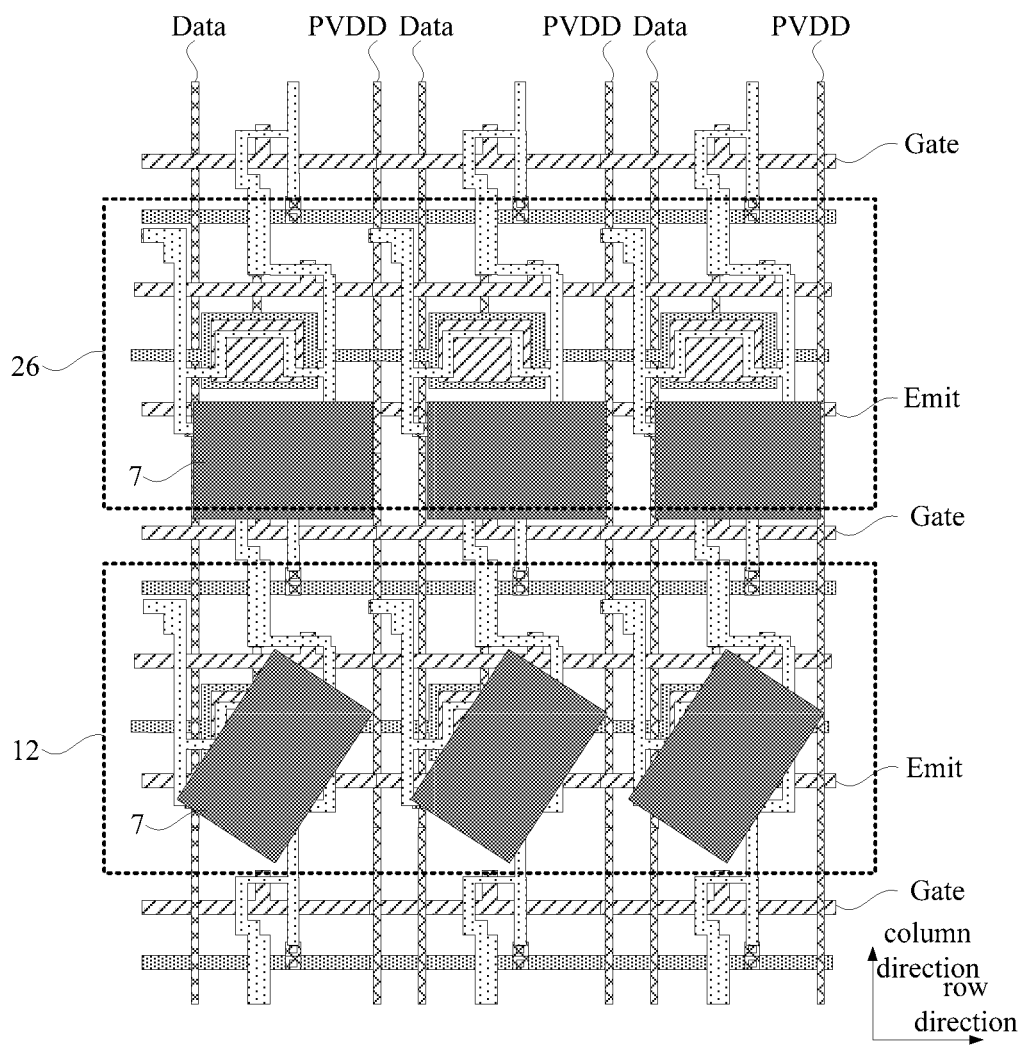
FIG. 19 is another schematic structural diagram of anodes within a non-fingerprint recognition region according to an embodiment of the present disclosure.

In another embodiment, it is also possible that the anode 7 located within the non-fingerprint recognition region 26 has a shape as in the related art. FIG. 19 is another schematic structural diagram of anodes within a non-fingerprint recognition region according to an embodiment of the present disclosure. As shown in FIG. 19, the shape of the anode 7 located within the non-fingerprint recognition region 26 is a rectangular shape, and the extension direction of one pair of opposite edges of the anode 7 is parallel to the row direction. The orthographic projection of the anode 7 on the base substrate 3 covers the orthographic projection of the corresponding primary non-opaque region 10 on the base substrate 3. Since the non-fingerprint recognition region 26 does not need to receive light reflected by the touch body, this arrangement of the anode 7 within the non-fingerprint recognition region 26 does not affect the reflected light.

Taking the shape of the anode 7 shown in FIG. 13 as an example, when the shape of the anode 7 within the red sub-pixel region, the shape of the anode 7 within the green sub-pixel region and the shape of the anode 7 within the blue sub-pixel region are all rhombic shapes, in the case where an aperture ratio is fixed, the light transmittance of the fingerprint recognition region of the display panel provided by this embodiment of the present disclosure and the light transmittance of the fingerprint recognition region of the display panel in the related art are tested. Table 1 is a date table for testing the light transmittance of the fingerprint recognition region of the display panel provided by this embodiment of the present disclosure, and Table 2 is a date table for testing the light transmittance of the fingerprint recognition region of the display panel in the related art. Three parallel tests have been made on the display panel provided by this embodiment of the present disclosure and the display panel in the related art. As shown in Table 1 and Table 2, among the three parallel tests, one is a reference test, and the other two are comparison tests. For the reference test, the test condition is that the aperture ratio of the red sub-pixel region is 4.65% while both the aperture ratio of the green sub-pixel region and the aperture ratio of the blue sub-pixel region are 7.21%. Under this condition, the transmittances of the two display panels are recorded as two reference values. For the two comparison tests, the conditions are respectively that the aperture ratio of the red sub-pixel region is 4.19% while both the aperture ratio of the green sub-pixel region and the aperture ratio of the blue sub-pixel region are 6.49%, and that the aperture ratio of the red sub-pixel region is 3.72% while both the aperture ratio of the green sub-pixel region and the aperture ratio of the blue sub-pixel region are 5.77%.

TABLE 1

|  | Aperture Ratio | | | Test Result |
| --- | --- | --- | --- | --- |
|  | Red sub-pixel region | Green sub-pixel region | Blue sub-pixel region | Amplification of transmittance with respect to reference test |
| Reference Test | 4.65% | 7.21% | 7.21% | — |
| Comparison Test I | 4.19% | 6.49% | 6.49% | 3.80% |
| Comparison Test II | 3.72% | 5.77% | 5.77% | 8.70% |

TABLE 2

|  | Aperture Ratio | | | Test Result |
| --- | --- | --- | --- | --- |
|  | Red sub-pixel region | Green sub-pixel region | Blue sub-pixel region | Amplification of transmittance with respect to reference test |
| Reference Test | 4.65% | 7.21% | 7.21% | — |
| Comparison Test I | 4.19% | 6.49% | 6.49% | 1.80% |
| Comparison Test II | 3.72% | 5.77% | 5.77% | 4.90% |

First, it should be noted that the aperture ratio refers to a ratio of an area of the aperture region to an area of the sub-pixel region 4. Since the area of the aperture region of the sub-pixel region 4 is proportional to an area of the anode 7, the aperture ratio can reflect the size of the area of the anode 7 of the sub-pixel region 4.

It is known from Table 1 and Table 2 that, when the aperture ratio corresponding to the red sub-pixel region, the aperture ratio corresponding to the green sub-pixel region and the aperture ratio corresponding to the blue sub-pixel region are fixed, the shape of the anode 7 within the red sub-pixel region, the shape of the anode 7 within the green sub-pixel region and the shape of the anode 7 within the blue sub-pixel region are as shown in FIG. 13, and the area of the anode 7 within the red sub-pixel region, the area of the anode 7 within the green sub-pixel region and the area of the anode 7 within the blue sub-pixel region satisfy that $S1<S2 \leq S3$, compared with the reference test, this embodiment of the present disclosure increases the light transmittances of the display panel provided by this embodiment of the present disclosure by 3.80% and 8.7%, respectively, while the light transmittances of the display panel in the related art are respectively increased by 1.80% and 4.90%. That is, the amplification of light transmittance of the display panel provided by this embodiment of the present disclosure with respect to the reference test is larger than the amplification of light transmittance of the display panel in the related art with respect to the reference test. In other words, the light transmittance corresponding to this embodiment of the present disclosure is larger than the light transmittance corresponding to the related art. Therefore, compared with the related art, the light transmittance in the fingerprint recognition region 12 can be improved by this embodiment of the present disclosure.

Figure 20:
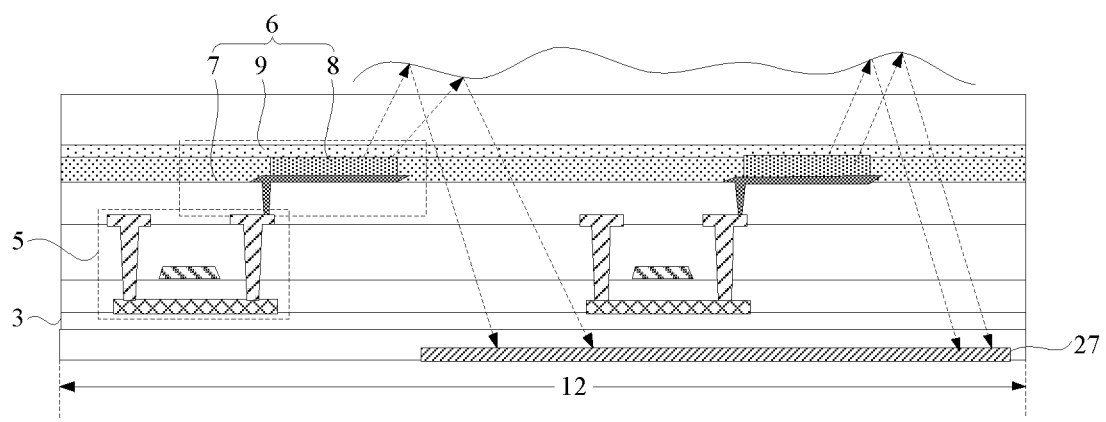
FIG. 20 is a schematic structural diagram of a light sensing fingerprint recognition device according to an embodiment of the present disclosure.

FIG. 20 is a schematic structural diagram of a light sensing fingerprint recognition device according to an embodiment of the present disclosure. As shown in FIG. 20, the display panel further includes a light sensing fingerprint recognition device corresponding to the fingerprint recognition region 12, and the light sensing fingerprint recognition device includes a light sensing device 27 and a fingerprint recognition device (not shown). During fingerprint recognition, light emitted by a light source (such as the light-emitting element 6 within the fingerprint recognition region 12) reaches the touch body, and the touch body reflects the light to form reflected light, which in turn reaches the light sensing device 27 through the region within the primary non-opaque region 10 not blocked by the anode 7. The light sensing device 27 is configured to sense the received reflected light. The fingerprint recognition device is electrically connected to the light sensing device 27. The fingerprint recognition device is configured to recognize valleys and ridges of the fingerprint according to intensity of the reflected light received by the light sensing device 27.

Figure 21:
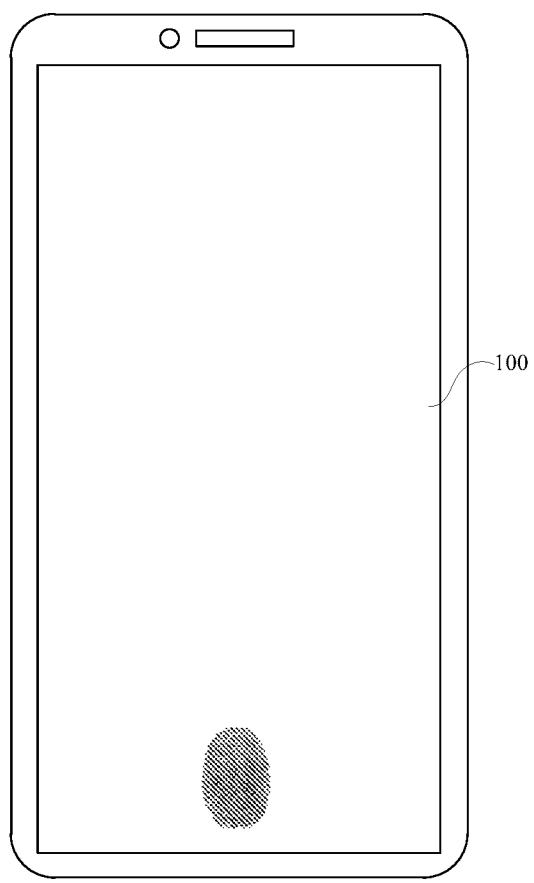
FIG. 21 is a schematic structural diagram of a display device according to an embodiment of the present disclosure.

An embodiment of the present disclosure further provides a display device as shown in FIG. 21, which is a schematic structural diagram of a display device according to an embodiment of the present disclosure. The display device includes the abovementioned display panel 100. The structure of the display panel 100 has been described in details in the above embodiments and will not be further described herein. It should be noted that the display device shown in FIG. 21 is merely illustrative, and the display device can be any electronic device having a display function, such as a cellphone, a tablet computer, a notebook computer, an electronic paper book, or a television.

The display device provided by this embodiment of the present disclosure includes the abovementioned display panel 100. Therefore, with the display device, the degree of the anode blocking the primary non-opaque region can be reduced, thereby enlarging the region within the primary non-opaque region which is not blocked by the anode. In this way, during the fingerprint recognition process, the probability of the reflected light reaching the fingerprint recognition region after passing through the primary non-opaque region can be increased and thus the amount of the reflected light that reaches the fingerprint recognition region can be increased, which thereby increases the detection accuracy of fingerprint recognition.

What is claimed is:

1. A display panel, having a display area and a non-display area surrounding the display area, comprising:
   a base substrate;
   a plurality of gate lines provided on base substrate and extending in a row direction and a plurality of data lines provided on base substrate and extending in a column direction, wherein the plurality of gate lines intersects with the plurality of data lines to define a plurality of sub-pixel regions;
   a plurality of pixel circuits arranged in a matrix on the base substrate and a plurality of light-emitting elements, wherein one of the plurality of pixel circuits and one of the plurality of light-emitting elements are provided in each of the plurality of sub-pixel regions, and each of the plurality of light-emitting elements comprises an anode, a light-emitting layer and a cathode that are sequentially stacked on a side of the plurality of pixel circuits facing away from the base substrate; and
   a plurality of light-emission control signal lines provided on the base substrate and extending in the row direction and a plurality of power signal lines provided on the base substrate and extending in the column direction, wherein the plurality of light-emission control signal lines intersects with the plurality of data lines in an insulation manner, and the plurality of power signal lines intersects with the plurality of gate lines in an insulation manner; the plurality of light-emission control signal lines and the plurality of power signal lines divide each of the plurality of sub-pixel regions into a primary non-opaque region and a non-primary non-opaque region; and a corresponding one of the plurality of pixel circuits is located within the non-primary non-opaque region,
   wherein the display area comprises a fingerprint recognition region, and for each sub-pixel region of the plurality of sub-pixel regions within the fingerprint recognition region, the anode is in an approximately quadrangular shape having two pairs of parallel opposite edges, and at least one pair of the two pairs of opposite edges of the anode extends along an extension direction forming an angle α with respect to the row direction, where 0°<α<90°.

2. The display panel according to claim 1, wherein 30°≤α≤70°.

3. The display panel according to claim 1, wherein a geometric center of the anode substantially coincides with a geometric center of the primary non-opaque region.

4. The display panel according to claim 1, wherein one pair of the two pairs of opposite edges of the anode comprises two first edges that are opposite to each other, and the primary non-opaque region comprises two second edges that are opposite to each other, the two second edges extend along the row direction, and a perpendicular distance between the two first edges is smaller than a perpendicular distance between the two second edges;
   an orthographic projection of one of the two first edges on the base substrate intersects with an orthographic projection of at least one of the two second edges on the base substrate.

5. The display panel according to claim 4, wherein the other one pair of the two pairs of opposite edges of the anode comprises two third edges that are opposite to each other, and the primary non-opaque region further comprises two fourth edges that are opposite to each other;
   an orthographic projection of one of the two third edges on the base substrate intersects with an orthographic projection of at least one of the two second edges and/or at least one of the two fourth edges on the base substrate.

6. The display panel according to claim 4, wherein at least one diagonal of the anode has a length larger than the perpendicular distance between the two second edges.

7. The display panel according to claim 4, wherein the primary non-opaque region further comprises two fourth edges that are opposite to each other, and each of the two second edges has a length larger than a length of each of the two fourth edges;
   the anode comprises a first diagonal and a second diagonal, and a length of the first diagonal is larger than a length of the second diagonal;
   an orthographic projection of the first diagonal on the base substrate intersects with orthographic projections of the two second edges on the base substrate.

8. The display panel according to claim 1, wherein the anode located within the fingerprint recognition region has a shape selected from a rectangular shape, a square shape, a parallelogram shape, or a rhombic shape.

9. The display panel according to claim 8, wherein the anode has the parallelogram shape, and one pair of two pairs of opposite edges of the anode extend in an extension direction parallel to the row direction or the column direction.

10. The display panel according to claim 1, wherein the anode located within the fingerprint recognition region has a rhombic shape or an approximately rhombic shape, and a diagonal of the rhombic shape or the approximately rhombic shape is parallel to the row direction.

11. The display panel according to claim 1, wherein the plurality of sub-pixel regions comprises a first color sub-pixel region, a second color sub-pixel region, and a third color sub-pixel region;
the anode located within the first color sub-pixel region, the anode located within the second color sub-pixel region, and the anode located within the third color sub-pixel region are circularly arranged in the column direction, adjacent anodes are not aligned in the row direction, and the anodes of sub-pixel regions having a same color are not adjacent.

12. The display panel according to claim 11, wherein the first color sub-pixel region is a red sub-pixel region, the second color sub-pixel region is a blue sub-pixel region, and the third color sub-pixel region is a green sub-pixel region;
in the fingerprint recognition region, the anode located within the first color sub-pixel region has an area of S1, the anode located within the second color sub-pixel region has an area of S2, and the anode located within the third color sub-pixel region has an area of S3, where $S1<S2 \leq S3$.

13. The display panel according to claim 12, wherein for each sub-pixel region of the plurality of sub-pixel regions located within the fingerprint recognition region, one pair of two pairs of opposite edges of the anode extends along an extension direction forming a first angle with respect to the row direction, and the other one pair of the two pairs of opposite edges of the anode extends along an extension direction forming a second angle with respect to the row direction;
the first angles corresponding to the first color sub-pixel region, the second color sub-pixel region and the third color sub-pixel region are respectively $\alpha 11$, $\alpha 12$, and $\alpha 13$, and the second angles corresponding to the first color sub-pixel region, the second color sub-pixel region and the third color sub-pixel region are respectively $\alpha 21$, $\alpha 22$, and $\alpha 23$; where $\alpha 11 < \alpha 12 \leq \alpha 13$, and $\alpha 21 > \alpha 22 \geq \alpha 23$.

14. The display panel according to claim 1, wherein a pixel definition layer is further provided between the anode and the cathode in one of the plurality of sub-pixel regions, and the pixel definition layer is provided with apertures corresponding to anodes in an one-to-one correspondence and exposing the anodes;
each of the apertures has a same shape as the corresponding anode, and extension directions of two diagonals of each aperture are the same as extension directions of two diagonals of the corresponding anode; and orthographic projections of edges of each aperture on the base substrate are located within an orthographic projection of the corresponding anode on the base substrate.

15. The display panel according to claim 1, wherein a shape of each light-emitting layer within the fingerprint recognition region is the same as a shape of a corresponding anode, and extension directions of two diagonals of the light-emitting layer are the same as extension directions of two diagonals of the corresponding anode.

16. The display panel according to claim 15, wherein the shape of each light-emitting layer within the fingerprint recognition region is a rectangle shape or a rounded rectangle shape.

17. The display panel according to claim 1, wherein the display area further comprises a non-fingerprint recognition region;
for each sub-pixel region of the plurality of sub-pixel regions having a same color, the shape of each anode located within the non-fingerprint recognition region is the same as the shape of each anode located within the fingerprint recognition region, and a pattern formed by the anodes located within the non-fingerprint recognition region is the same as a pattern formed by the anodes located within the fingerprint recognition region after the anode being translated.

18. The display panel according to claim 1, wherein the display area further comprises a non-fingerprint recognition region;
for each sub-pixel region of the plurality of sub-pixel regions within the non-fingerprint recognition region, each anode has a rectangular shape, and one pair of opposite edges of the anode extends in a direction parallel to the row direction; an orthographic projection of the anode on the base substrate covers an orthographic projection of the corresponding primary non-opaque region on the base substrate.

19. The display panel according to claim 1, further comprising a light sensing fingerprint recognition device corresponding to the fingerprint recognition region, wherein the light sensing fingerprint recognition device comprises a light sensing device and a fingerprint recognition device; and
wherein the light sensing device is configured to sense light reflected by a touch body, and the fingerprint recognition device is configured to recognize valleys and ridges of a fingerprint according to the reflected light.

20. A display device, comprising:
a display panel having a display area and a non-display area surrounding the display area, the display panel comprising:
a base substrate;
a plurality of gate lines provided on base substrate and extending in a row direction and a plurality of data lines provided on base substrate and extending in a column direction, wherein the plurality of gate lines intersects with the plurality of data lines to define a plurality of sub-pixel regions;
a plurality of pixel circuits arranged in a matrix on the base substrate and a plurality of light-emitting elements, wherein one of the plurality of pixel circuits and one of the plurality of light-emitting elements are provided in each of the plurality of sub-pixel regions, and each of the plurality of light-emitting elements comprises an anode, a light-emitting layer and a cathode that are sequentially stacked on a side of the plurality of pixel circuits facing away from the base substrate; and
a plurality of light-emission control signal lines provided on the base substrate and extending in the row direction and a plurality of power signal lines provided on the base substrate and extending in the column direction, wherein the plurality of light-emission control signal lines intersects with the plurality of data lines in an insulation manner, and the plurality of power signal lines intersects with the plurality of gate lines in an insulation manner; the plurality of light-emission control signal lines and the plurality of power signal lines divide each of the plurality of sub-pixel regions into a primary non-opaque region and a non-primary non-opaque region; and a corresponding one of the plurality of pixel circuits is located within the non-primary non-opaque region, wherein the display area comprises a fingerprint recognition region, and for each sub-pixel region of the plurality of sub-pixel regions within the fingerprint recognition region, the anode is in an approximately quadrangular shape having two pairs of parallel opposite edges, and at least one pair of the two pairs of opposite edges of the anode extends along an extension direction forming an angle $\alpha$ with respect to the row direction, where $0°<\alpha<90°$.

* * * * *